United States Patent [19]
Suzuki et al.

[11] Patent Number: 6,051,343
[45] Date of Patent: Apr. 18, 2000

[54] POLYMERIC SOLID ELECTROLYTE AND LITHIUM SECONDARY CELL USING THE SAME

[75] Inventors: Hisashi Suzuki; Satoshi Maruyama; Kazuhide Ohe, all of Chiba, Japan

[73] Assignee: TDK Corporation, Tokyo, Japan

[21] Appl. No.: 08/937,661

[22] Filed: Sep. 24, 1997

[30] Foreign Application Priority Data

Sep. 25, 1996 [JP] Japan ................................... 8-274103

[51] Int. Cl.[7] .................................................. H01M 10/08
[52] U.S. Cl. .......................... 429/316; 429/303; 429/309
[58] Field of Search ..................... 429/300, 303, 429/304, 306, 309, 316; 252/62.2

[56] References Cited

U.S. PATENT DOCUMENTS

| | | | |
|---|---|---|---|
| 4,655,963 | 4/1987 | Koga et al. ............................. | 252/511 |
| 5,296,318 | 3/1994 | Gozdz et al. ............................ | 429/192 |
| 5,571,634 | 11/1996 | Gozdz et al. ............................ | 429/192 |
| 5,609,975 | 3/1997 | Hasegawa et al. ...................... | 429/217 |

FOREIGN PATENT DOCUMENTS 62-34324   7/1987   Japan .

OTHER PUBLICATIONS

General Chemsitry by Darrell Ebbing, Houghton Mifflin Company, p. G–1, 1996.

*Primary Examiner*—Maria Nuzzolillo
*Assistant Examiner*—J. O'Malley
*Attorney, Agent, or Firm*—Oblon, Spivak, McClelland, Maier & Neustadt, P.C.

[57] ABSTRACT

To overcome the drawbacks of a P(VDF-HFP) system gel electrolyte and a cell using the same, a polymer having a vinylidene fluoride copolymer as a backbone and polyvinylidene fluoride in a side chain featuring good adhesion and exhibiting electro-chemical properties similar to the P(VDF-HFP) system without a crosslinking step is used as a binder for a gel electrolyte or electrode. The invention improves the adhesion of gel electrolyte to a current collector or electrode to reduce internal resistance; develops a polymeric solid electrolyte which is storage stable and capable of continuous lamination of coating layers; and provides an electrode which does not require an extra crosslinking step in assembly procedure, prevents positive and negative electrode materials from stripping off, and experiences a minimal capacitance drop upon repetitive charge/discharge cycles. A lithium secondary cell and an electric double-layer capacitor using the electrode is also described.

6 Claims, 3 Drawing Sheets

POLYMERIC SOLID ELECTROLYTE AND LITHIUM SECONDARY CELL USING THE SAME

BACKGROUND OF THE INVENTION

1. Field of the Invention

This invention relates to a polymeric solid electrolyte and electrode for use in lithium secondary cells and electric double-layer capacitors, and a lithium secondary cell, electric double-layer capacitor and EL device using the polymeric solid electrolyte and electrode.

2. Background Art

Secondary batteries for use in notebook size personal computers, video cameras, and cellular phones are required to have a high capacitance and a satisfactory charge/discharge cycle life. The secondary batteries which have been used heretofore include lead acid batteries, nickel-cadmium batteries, and nickel-hydrogen batteries. Lithium secondary batteries have been used in practice as a smaller size, higher capacitance battery.

For example, JP-A 121260/1988 discloses a secondary cell using a non-aqueous electrolytic solution, $LiCoO_2$ and/or $LiNiO_2$ as a positive electrode, and carbon as a negative electrode. At the negative electrode in this secondary cell, for example, lithium ions enter between layers of hexagonal net planes of carbon to receive electrons during charging while lithium between carbon layers is ionized again by releasing electrons. The lithium secondary cell of this type, which is known as a Li-ion secondary cell, provides a high capacitance for a small size and is safe due to the eliminated need for highly reactive metallic lithium. There is a strong desire to further improve its performance.

The electrode used in lithium secondary cells is manufactured by joining an active material such as carbon material powder and lithium composite oxide powder to a surface of a current collector in the form of a copper or aluminum foil. More particularly, the active material powder is dispersed in a binder solution and then coated onto the current collector surface while the binder must meet the following requirements.

(1) The binder has a sufficient bond strength to prevent a coating of active material from stripping from the current collector and cracking in a battery assembling process.

(2) The binder is not soluble in an electrolytic solution.

(3) The binder has a sufficient bond strength to prevent a coating from stripping from the current collector and cracking upon repetitive charge/discharge cycles.

(4) A small amount of the binder added provides sufficient bond strength.

(5) The binder is not oxidized or reduced in the operating voltage range.

(6) The binder is not soluble in an organic solvent for use in an electrolytic solution, but soluble in a solvent for use in coating to the current collector surface.

In the above-referred JP-A 121260/1988, polyvinylidene fluoride (PVDF) is used as the binder. However, a large amount of polyvinylidene fluoride must be added in order to increase bond strength although this tends to invite insufficient cell capacitance because the binder does not contribute to cell capacitance. Another problem is that since polyvinylidene fluoride is soluble in an non-aqueous solvent of an electrolytic solution, repetitive charge/discharge cycles can cause stripping and cracking of the coating to reduce the cell capacitance even when polyvinylidene fluoride is added in large amounts.

Also, PVDF causes many troubles in an actual battery manufacturing process since it is a crystalline resin. In one exemplary process, a coating solution of active material dispersed in a PVDF solution is coated onto a current collector (e.g., copper foil) and dried to form an electrode. If a drying rate and other factors are inadequate in this process, undesirably the electrode mix layer can strip from the current collector or curl even if it does not strip because of a substantial difference in shrinkage factor between PVDF and the current collector. Even when no problems are found immediately after coating and drying, there is a likelihood that the electrode mix layer gradually strip from the current collector with the lapse of time owing to the internal stresses remaining in the electrode. Furthermore, JP-B 4007/1996 proposes fluorinated high molecular weight copolymers including PVDF, which also suffer from problems similar to the PVDF.

Besides, a number of other compounds have been used as the binder. Of these compounds, preferred examples are crosslinkable polymers. Included are polymers which are crosslinked using polyamines, polyols or peroxides as a crosslinking agent, for example, at least one of vinylidene fluoride-hexafluoropropylene copolymers, vinylidene fluoride-hexafluoropropylene-tetrafluoroethylene copolymers, tetrafluoroethylene-propylene copolymers, tetrafluoroethylene-propylene-vinylidene fluoride copolymers, and perfluoro fluororubbers crosslinked with the above-mentioned crosslinking agent. The amount of the crosslinking agent added is generally about 0.5 to 10 parts, preferably about 1 to 5 parts by weight per 100 parts by weight of the compound to be crosslinked.

Also included are fluorine-containing compounds which are crosslinked with radiation such as β-rays and γ-rays, for example, at least one of polyvinylidene fluoride, vinylidene fluoride-hexafluoropropylene copolymers, and fluorinated thermoplastic rubbers crosslinked with radiation. These compounds are described, for example, in Journal of the Japanese Chemical Society, No. 4, 686 (1976) and Industrial and Engineering Chemistry, Vol. 49, No. 10, 1687 (1957).

It is also proposed to use a silane-crosslinked polyvinylidene fluoride which is obtained by grafting a silane compound to polyvinylidene fluoride followed by crosslinking with water. The silane-crosslinked polyvinylidene fluoride is described, for example, in JP-A 115234/1990.

Allegedly the crosslinked polymers may be used as a mixture of two or more. In addition to the above-mentioned crosslinked polymers, the binder may contain another polymer such as polymethyl methacrylate (PMMA) and polycarbonate (PC). The other polymer is contained in an amount of less than about 25% by volume of the entire binder.

While the above-mentioned crosslinked polymers are preferred binders, they require an extra crosslinking step before use in practice, imposing a problem to the manufacture process.

Most of currently commercially available batteries use as the electrolyte a so-called electrolytic solution obtained by dissolving an electrolyte salt in a liquid solvent. Batteries using electrolytic solution have the advantage of low internal resistance while they suffer from the problems of frequent solvent leakage and potential ignition. In view of these problems, research has long been made on solvent-free electrolytes, that is, solid electrolytes. For example, systems having electrolyte salts dissolved in polymers are known. It is noted that such solid electrolytes which are completely free of solvents (for example, lithium salt dissolved in polyethylene oxide) have not reached a practical level because of a low conductivity of less than $10^{-4}$ S/cm. In contrast, gel-like polymeric solid electrolytes comprising a polymer, an electrolyte salt, and a solvent have been highlighted in the recent years.

Such gel-like polymeric solid electrolytes, which are referred to as "gel electrolytes" hereinafter, have a conductivity close to liquids and some mark a conductivity of the order of $10^{-3}$ S/cm.

For example, U.S. Pat. No. 5,296,318 discloses a gel electrolyte containing 20 to 70% by weight of a lithium salt solution in a copolymer P(VDF-HFP) of vinylidene fluoride (VDF) with 8 to 25% by weight of hexafluoropropylene (HFP). This gel electrolyte has a conductivity up to $10^{-3}$ S/cm. Originally, polyvinylidene fluoride (PVDF) is a crystalline polymer having relatively high chemical resistance. Namely, PVDF are well soluble in some solvents, but not soluble in every solvent. Among fluoro-resins, PVDF is one of easy-to-use resins. In fact, PVDF is used as a binder for positive and negative active materials in commercially available Li-ion secondary batteries. The PVDF described in the above-referred patent is a copolymer of VDF and HFP wherein HFP lowers the crystallinity of PVDF. These VDF-HFP copolymers can retain a large amount of solvent, inhibit the precipitation of lithium salt crystals, and ensure the formation of gel electrolyte having strength.

Despite the above-mentioned possibility to achieve a high conductivity, the VDF-HFP copolymer, in which HFP lowers the crystallinity of PVDF, has the drawbacks of chemical resistance and melting point drops inherently involved in such a polymer structure. For example, PVDF homopolymers commercially available from Elf Atochem (trademark, KYNAR 700 series) have a melting point of 170° C. whereas a VDF-HFP copolymer also commercially available from Elf Atochem, for example, KYNAR 2801 has a melting point of 145° C. Since the chemical resistance drop means that the copolymer is more soluble in the cell electrolytic solution, a cell using such a VDF-HFP copolymer is low in storage properties. For example, when the cell is stored at room temperature or elevated temperatures of 40° C., 60° C., 80° C. and 100° C., there occur capacitance losses and in an extreme case, internal short-circuit. The melting point drop restricts the use at high temperature and leads to poor storage properties at high temperature as mentioned above.

Furthermore, in a cell using a gel electrolyte as in U.S. Pat. No. 5,296,318, for example, an electrode is reduced in interfacial resistance by using a composition of electrode active material and a gel electrolyte to improve the adhesion between the electrode and the gel electrolyte. The electrode disclosed in this patent, however, is less adhesive to the current collector to be coated therewith, leaving the possibility that the electrode mix portion strip after coating. The PVDF separates from the current collector because PVDF has a substantial shrinkage factor upon coating and drying due to the crystalline resin nature. This means that conductivity becomes increased whereas adhesion to the current collector is insufficient. For this reason, when the gel electrolyte described in this patent is used, the electrode formation is not achievable by a simple coating step and the continuous lamination of coating films is difficult. Thus, an electrode is constructed using metal mesh as a support. Another device using the above-mentioned binder material as an electrode material is an electric double-layer capacitor. When the binder material is used as a polarizing electrode material in an electric double-layer capacitor, it is also desired to improve the properties of the binder material as in the case of lithium secondary cells. Better gel electrolytes are demanded for the electric double-layer capacitor too.

Also known is an EL device comprising a light emitting layer containing a fluorescent material and a binder. The development of a binder material for the EL device is also desired.

SUMMARY OF THE INVENTION

An object of the present invention is to provide a polymeric solid electrolyte which improves the adhesion of gel electrolyte to a current collector or electrode, that is the drawback of prior art gel electrolytes, to reduce internal resistance and which is storage stable and capable of continuous lamination of coating layers, and a lithium secondary cell and an electric double-layer capacitor using the electrolyte.

Another object of the present invention is to provide an electrode which does not require an extra crosslinking step in an assembly process, prevents stripping of positive and negative electrode materials, and experiences a minimized capacitance loss upon repetitive charge/discharge cycles, and a lithium secondary cell and an electric double-layer capacitor using the electrode.

A further object of the present invention is to provide an EL device having improved adhesion to an electrode, low internal resistance, and storage stability.

To overcome the drawbacks of the P(VDF-HFP) copolymer gel electrolyte and the cell using the same disclosed in U.S. Pat. No. 5,296,318, we have made investigations on a number of polymers to find that a polymer having a vinylidene fluoride copolymer as a backbone and polyvinylidene fluoride in a side chain is improved in adhesion and exhibits electrochemical properties equivalent to the P(VDF-HFP) copolymer without a crosslinking step.

These and other objects are achieved by the present invention which is defined below as constructions (1) through (16).

(1) A polymeric solid electrolyte comprising a polymer having a vinylidene fluoride copolymer as a backbone and polyvinylidene fluoride in a side chain, an electrolyte salt, and a solvent.

(2) The polymeric solid electrolyte of (1) wherein said vinylidene fluoride copolymer is a copolymer of vinylidene fluoride with chlorotrifluoroethylene.

(3) A polymeric solid electrolyte comprising a polymer alloy of the polymer of (1) with polyvinylidene fluoride, an electrolyte salt, and a solvent.

(4) A lithium secondary cell comprising a polymeric solid electrolyte containing a polymer having a vinylidene fluoride copolymer as a backbone and polyvinylidene fluoride in a side chain, an electrolyte salt, and a solvent.

(5) The lithium secondary cell of (4) wherein said vinylidene fluoride copolymer is a copolymer of vinylidene fluoride with chlorotrifluoroethylene.

(6) The lithium secondary cell of (4) wherein the polymeric solid electrolyte contains said polymer in the form of a polymer alloy with polyvinylidene fluoride.

(7) A lithium secondary cell comprising at least one electrode of a composition comprising a polymer having a vinylidene fluoride copolymer as a backbone and polyvinylidene fluoride in a side chain and an electrode active material.

(8) The lithium secondary cell of (7) comprising a polymeric solid electrolyte containing a polymer having a vinylidene fluoride copolymer as a backbone and polyvinylidene fluoride in a side chain, an electrolyte salt, and a solvent.

(9) The lithium secondary cell of (8) wherein said polymer is contained in the form of a polymer alloy with polyvinylidene fluoride.

(10) The lithium secondary cell of (7) wherein a carbonaceous material, lithium metal, lithium alloy or lithium oxide material is used as a negative electrode active material, and a compound or carbon capable of intercalating and deintercalating lithium ions is used as a positive electrode active material.

(11) An electric double-layer capacitor comprising a polymeric solid electrolyte containing a polymer having a vinylidene fluoride copolymer as a backbone and polyvinylidene fluoride in a side chain, an electrolyte salt, and a solvent.

(12) The electric double-layer capacitor of (11) wherein said vinylidene fluoride copolymer is a copolymer of vinylidene fluoride with chlorotrifluoroethylene.

(13) The electric double-layer capacitor of (11) wherein said polymer is contained as a polymer alloy with polyvinylidene fluoride.

(14) The electric double-layer capacitor of (11) comprising at least one polarizing electrode containing a polymer having a vinylidene fluoride copolymer as a backbone and polyvinylidene fluoride in a side chain.

(15) The electric double-layer capacitor of (14) wherein said vinylidene fluoride copolymer is a copolymer of vinylidene fluoride with chlorotrifluoroethylene.

(16) The electric double-layer capacitor of (14) wherein said polymer is contained as a polymer alloy with polyvinylidene fluoride.

The polymer having a vinylidene fluoride copolymer as a backbone and polyvinylidene fluoride in a side chain has elasticity and appropriate crystallinity since its backbone is composed of rubber and its side chain composed of crystalline resin. Where a gel electrolyte is comprised of such a polymer, an electrolyte salt, and a solvent, the electrolyte salt and solvent can be contained in an amorphous moiety in sufficiently large amounts to provide high conductivity. An appropriate crystalline moiety ensures a gel electrolyte having strength. By virtue of good chemical resistance and a high melting point, the gel electrolyte can work in a wide temperature range from low temperature to high temperature.

By virtue of elasticity, the gel electrolyte is improved in adhesion to an electrode or current collector and has a reduced interfacial resistance. Also, when the gel electrolyte is used in a lithium secondary cell, the cell can have low internal resistance and be used in a wide temperature range from low temperature to high temperature. Similar effects are obtainable in an electric double-layer capacitor.

To join a coating of positive or negative electrode active material to a surface of a current collector, a binder comprising the polymer having a vinylidene fluoride copolymer as a backbone and polyvinylidene fluoride in a side chain is used. The polymer has flexibility in a rubbery state at about room temperature because its backbone composed of rubber and its side chain composed of crystalline resin, and improved chemical resistance because of its side chain composed of crystalline PVDF and its backbone composed preferably of a copolymer of vinylidene fluoride (VDF) and trifluorochloroethylene (CTFE). That is, the polymer has nature intermediate fluororubber and PVDF.

The inventive polymeric material has the following advantages when used as a binder for an electrode. When an electrode is prepared by coating a coating solution of a cell active material dispersed in a polymeric material solution to a current collector followed by drying, the low crystallinity and low shrinkage factor of this polymeric material ensure effective adhesion between the current collector and the electrode mix layer. The electrode is flexible enough to prevent the electrode mix layer from stripping off even when it is bent. Further, since the polymeric material is not dissolved in a cell electrolytic solution because of the chemical resistance mentioned above, it can be used as a binder for an electrode or a matrix of a gel electrolyte to form a cell having an improved charge/discharge cycle lifetime.

Also, since the inventive polymeric material can establish a good bond between active materials or between a current collector and an active material, even an electrode having a thick electrode mix layer can give a desired potential to the active material by virtue of a low contact resistance. Therefore, a potential necessary for intercalation and deintercalation can be established, offering a high performance, high capacitance lithium secondary cell.

The inventive polymeric material also exhibits favorable properties when applied to an electrode of an electric double-layer capacitor.

In summary, using a gel electrolyte having improved adhesion to a current collector and electrode, the present invention is successful in providing a polymeric solid electrolyte having minimized internal resistance and storage stability, a lithium secondary cell and an electric double-layer capacitor using the same.

DESCRIPTION OF THE PREFERRED EMBODIMENTS

Figure 1:
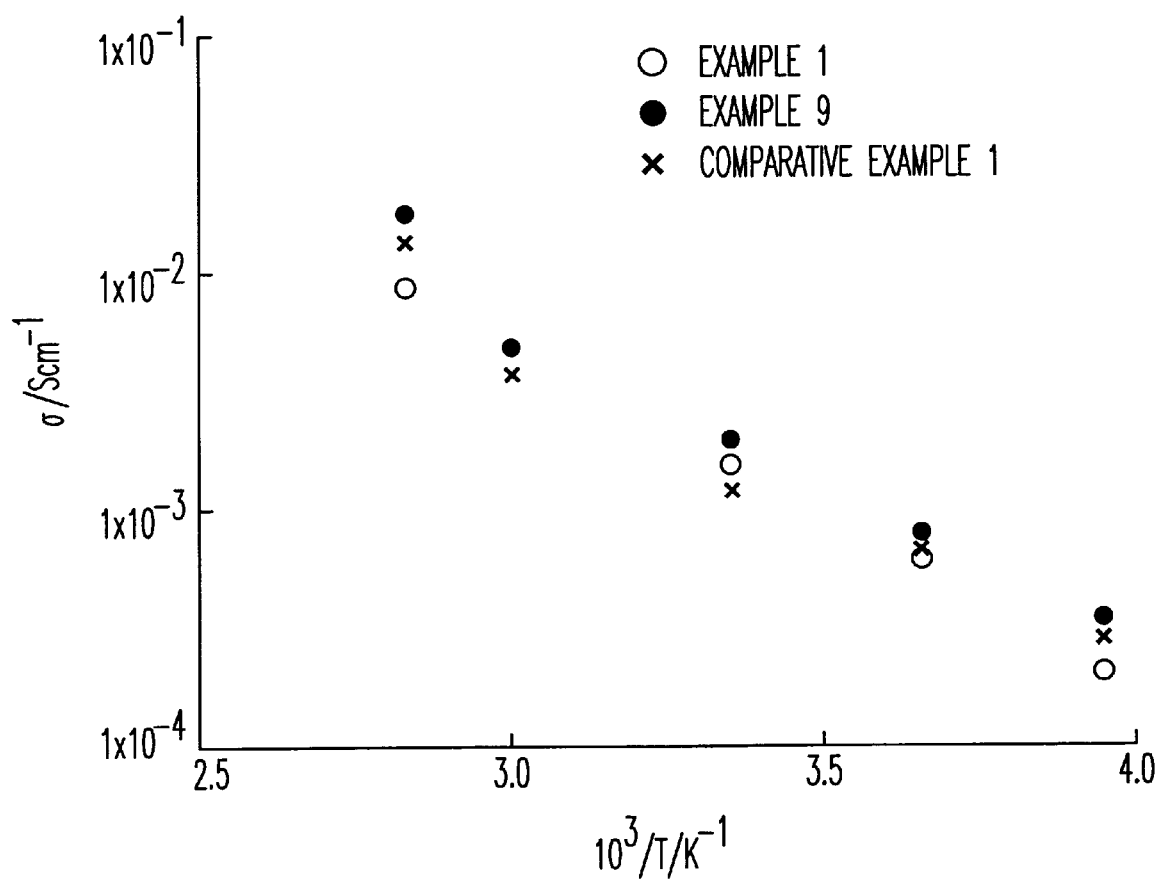
FIG. 1 is a graph showing the conductivity versus temperature of gel electrolytes according to the invention.

The polymeric solid electrolyte of the invention which is also referred to as gel electrolyte contains a polymer having a vinylidene fluoride copolymer as a backbone and polyvinylidene fluoride in a side chain, an electrolyte salt, and a solvent. The vinylidene fluoride copolymer is preferably a copolymer of vinylidene fluoride (VDF) with chlorotrifluoroethylene (CTFE). Since the polymer is well compatible with PVDF, a polymer alloy of the polymer with PVDF may be used as the polymer in the gel electrolyte. The use of such a gel electrolyte in a lithium secondary cell or the like ensures good storage stability, charge/discharge performance, and high-temperature resistance.

The polymers having the above-mentioned structure are commercially available as flexible fluoro-resins under the trade name of "CEFRAL SOFT" from Central Glass K.K. CEFRAL SOFT is a family of polymers having a backbone composed of vinylidene fluoride-chlorotrifluoroethylene (VDF-CTFE) copolymer and side chains composed of polyvinylidene fluoride. Preferably the backbone accounts for about 45 to 85% by weight, more preferably about 50 to 80% by weight, further preferably about 55 to 75% by weight, especially about 60 to 70% by weight of the entire polymer while the side chains account for about 55 to 15% by weight, more preferably about 50 to 20% by weight, further preferably about 45 to 25% by weight, especially about 40 to 30% by weight of the entire polymer. The proportion of VDF in the backbone is preferably about 65 to 95 mol %, more preferably 70 to 90 mol %, especially about 75 to 85 mol % while the proportion of CTFE is preferably about 35 to 5 mol %, more preferably 30 to 10 mol %, especially about 25 to 15 mol %. They have a melting point of about 155 to 170° C. and a density of about 1.7 to 1.9.

These polymers may be synthesized in accordance with well-known methods by copolymerizing vinylidene fluoride, a fluorinated monomer, and an unsaturated peroxide to form a backbone or trunk resin, decomposing a peroxy group in the backbone resin to generate a radical, polymerizing a branch resin from the radical, and graft polymerizing a vinylidene fluoride homopolymer.

The unsaturated peroxides used herein include unsaturated peroxyesters such as t-butyl peroxymethacrylate and unsaturated peroxycarbonates such as t-butyl peroxyallylcarbonate.

It is believed that since the resulting resin is a graft copolymer with a crystalline side chain resin, hard segments of crystalline resin agglomerate to provide physical crosslinking sites to the molecular chain or backbone of rubber. Therefore, the polymer is non-oriented like rubbery materials, has a reduced contact resistance due to good adhesion to a current collector and electrode, and can construct a cell having a reduced internal resistance and good charge/discharge performance. The polymer is not dissolved in electrolytic solutions of ethylene carbonate and diethyl carbonate, ensuring good storage properties. When the polymer is used as a binder for an electrode, a high bonding force to a current collector results in a reduced contact resistance, which allows to impart a desired potential to the active material to establish a potential necessary for intercalation and deintercalation.

The gel electrolyte using the above-mentioned polymer may contain a vinylidene fluoride polymer, especially PVDF homopolymer to form a polymer alloy. This results in improved tensile strength. The content of the PVDF homopolymer is preferably adjusted so as to give a ratio of polymer to PVDF homopolymer of from 90:10% by weight to 50:50% by weight.

Next, a method for preparing the gel electrolyte is described. The preparation method is preferably carried out in a dry room or glove box having a limited water content. First the polymer is dispersed and dissolved in a solvent. The solvent may be properly selected from various solvents in which the polymer is soluble, for example, N,N-dimethylformamide, dimethylacetamide, N-methylpyrrolidone, acetone, methyl ethyl ketone, and methyl isobutyl ketone, with N-methylpyrrolidone and N,N-dimethylformamide being especially preferred. The concentration of the polymer in the solvent is preferably 10 to 30% by weight.

To reduce the viscosity of the polymer solution, methyl ethyl ketone is preferably added. The dispersing and dissolving step is preferably carried out by agitating while heating preferably at a temperature of lower than 100° C., more preferably 50 to 100° C.

To the polymer solution is added an electrolytic solution. The content of the electrolytic solution is preferably adjusted so as to give a ratio of polymer to electrolytic solution of from 50:50% by weight to 20:30% by weight. The solvent used in the electrolytic solution is preferably a non-aqueous solvent such as ethylene carbonate, propylene carbonate, butylene carbonate, dimethyl carbonate, diethyl carbonate, ethyl methyl carbonate, tetrahydrofuran, 2-methyltetrahydrofuran, 1,3-dioxolan, 4-methyldioxolan, γ-butyrolactone, sulfolane, 3-methylsulfolane, dimethoxyethane, diethoxyethane, ethoxymethoxyethane, and ethyl diglyme.

The electrolyte used herein is selected from electrolyte salts in dissolved form such as $LiPF_6$, $LiClO_4$, $LiBF_4$, $LiCF_3SO_3$, $(CF_3SO_2)_2NLi$, and $LiAsF_6$ when used in lithium secondary cells. They may be used in admixture of two or more while the mix ratio is arbitrary. The concentration of the electrolyte salt in the electrolytic solution of nor-aqueous solvent system is preferably 0.5 to 3 mol/liter.

A mix solution of the polymer solution and the electrolytic solution, which is referred to as "gel electrolyte solution," is applied onto a substrate. Any desired substrate may be used insofar as it is smooth. For example, polyester film, glass, and polytetrafluoroethylene film are useful. Means for applying the gel electrolyte solution to a substrate is not critical and may be properly determined in accordance with the material and shape of the substrate. In general, metal mask printing, electrostatic deposition, dip coating, spray coating, roll coating, doctor blade, gravure coating, and screen printing techniques are used. Thereafter, rolling is carried out by a platen press or calender roll if necessary.

At the end of coating, the solvent used to dissolve the polymer (e.g., N,N-dimethylformamide, boiling point 153° C., abbreviated as DMF, hereinafter) is evaporated off to complete a film of the gel electrolyte. The temperature at which DMF is evaporated off may be room temperature although heating is acceptable. The thus obtained gel electrolyte is translucent and elastic.

It is understood that the electrolytic solution may have been mixed at the time of preparing the gel electrolyte solution as mentioned above although a film free of the electrolytic solution may be preformed and then impregnated with the electrolytic solution. Also, $SiO_2$ and analogues may be utilized as a filler in order to increase film strength and swelling factor.

Although the structure of a lithium secondary cell using the gel electrolyte of the invention is not critical, the invention is generally applicable to laminate cells and cylindrical cells.

The electrode to be combined with the gel electrolyte is preferably formed of a composition comprising an electrode active material and the gel electrolyte.

The negative electrode is composed of a negative electrode active material such as carbonaceous materials, lithium metal, lithium alloy or oxide materials while the positive electrode is composed of a positive electrode active material such as oxide or carbonaceous materials capable of intercalating and deintercalating lithium ions. Using such electrodes, a lithium secondary cell having satisfactory properties is obtainable.

The carbonaceous material used as the active material may be properly selected from mesocarbon microbeads (MCMB), natural or artificial graphite, resin fired carbon materials, carbon black, and carbon fibers. They are used in powder form. Preferred of these is graphite desirably having a mean particle size of 1 to 30 μm, especially 5 to 25 μm.

Composite oxides containing lithium are preferred as the oxide capable of intercalating and deintercalating lithium ions, and such oxides are, for example, $LiCoO_2$, $LiMn_2O_4$, $LiNiO_2$, and $LiV_2O_4$. Powders of these oxides preferably have a mean particle size of about 1 to 40 μm.

Preferably the electrode composition contains the active material:conductive aid:gel electrolyte in a ratio of 30–90:3–10:10–70% by weight for the positive electrode and the active material:conductive aid:gel electrolyte in a ratio of 30–90:0–10:10–70% by weight for the negative electrode.

In the practice of the invention, the negative and/or positive electrode active material, preferably both the active materials, is preferably mixed with the above-described gel electrolyte before it is applied to a current collector surface.

The preparation of the electrode may be carried out in accordance with the above-mentioned preparation of the gel electrolyte. First, the active material and optional conductive aid are dispersed in a binder solution of the above-described polymer to form a coating solution. The solvent used in the coating solution may be properly selected from the above-mentioned variety of solvents in which the binder is soluble. The concentration and viscosity of the coating solution may be properly determined in accordance with an application means.

Means for applying the coating solution to a current collector is not critical and may be properly determined in accordance with the material and shape of the current collector. In general, metal mask printing, electrostatic deposition, dip coating, spray coating, roll coating, doctor blade, gravure coating, and screen printing techniques are used. Thereafter, rolling is carried out by a platen press or calender roll if necessary.

The current collector may be properly selected from conventional current collectors in accordance with the shape of a device to which the current collector is applied such as batteries and electric double-layer capacitors and the manner of disposing the current collector in a casing. In general, aluminum and analogues are used for the positive electrode and copper, nickel and analogues are used for the negative electrode.

Electrodes are prepared by applying an electrode coating solution having conductive aid and active material mixed therein onto a current collector such as a copper foil, nickel foil and aluminum foil, and evaporating off the solvent. The coating thickness is preferably about 50 to 400 μm. Metal foil and metal mesh are generally used as the current collector. Although the metal mesh has a lower contact resistance with the electrode than the metal foil, even the metal foil provides a sufficiently low contact resistance when the gel electrolyte of the invention is used.

By incorporating in the electrode the same gel electrolyte as the gel electrolyte, the adhesion of the electrode to the gel electrolyte is improved to reduce the internal resistance. In case lithium metal or lithium alloy is used as a negative electrode active material, a composition of a negative electrode active material and the gel electrolyte need not be used.

When the electrode of the invention is applied to a cell using a solution electrolyte, the electrolytic solution is prepared by dissolving an electrolyte in a non-aqueous solvent. The electrolyte used herein may be selected from the above-mentioned examples. The non-aqueous solvent may be selected from, for example, ethers, ketones, carbonates, and organic solvents as described in JP-A 121260/1988, with the carbonates being especially preferred in the practice of the invention.

Although the structure of the solution type lithium secondary cell using the electrode of the invention is not critical, it is generally applied to lamination batteries and cylindrical batteries.

Furthermore, the electrode of the invention is also useful in electric double-layer capacitors.

A current collector used as the polarizing electrode may be formed of conductive rubber such as conductive butyl rubber or by thermal spraying metals such as aluminum and nickel or by attaching metal mesh to one surface of the electrode layer.

For the electric double-layer capacitor, such polarizing electrodes are combined with the above-mentioned gel electrolyte.

Included in the electrolyte salt are $(C_2H_5)_4NBF_4$, $(C_2H_5)_3MeNBF_4$, and $(C_2H_5)_4PBF_4$.

The non-aqueous solvent used in the electrolytic solution may be selected from well-known various solvents, preferably electro-chemically stable non-aqueous solvents such as propylene carbonate, ethylene carbonate, γ-butyrolactone, acetonitrile, dimethylformamide, 1,2-dimethoxyethane, and sulfolane, alone or in admixture of two or more.

In the electrolytic solution of such non-aqueous solvent, the electrolyte may have a concentration of 0.1 to 3 mol/liter.

An insulator such as polypropylene and butyl rubber may be used as an insulating gasket.

Although the structure of the electric double-layer capacitor in which the gel electrolyte of the invention is used is not critical, usually the gel electrolyte is interleaved between a pair of polarizing electrodes and an insulating gasket is disposed at the periphery of the polarizing electrodes and the gel electrolyte. Such an electric double-layer capacitor may be any of the coin, paper and laminate types.

Although the electrode of the invention is used in lithium secondary cells and electric double-layer capacitors in the above-described embodiments, the application of the invention is not limited to the electrodes of such secondary batteries and electric double-layer capacitors, and various modifications and changes are possible. For example, one variant is an application to electroluminescent (EL) devices. More particularly, the use of the polymeric resin having a backbone composed of vinylidene fluoride copolymer and side chains composed of polyvinylidene fluoride as a binder for rare earth fluorescent materials in dispersion type EL devices improves the bond to an electrode surface (a hole injecting and transporting layer and an electron injecting and transporting layer), reducing the manufacture cost.

Examples of the present invention are given below by way of illustration.

EXAMPLE 1

All the steps were carried out in an argon glove box. A container of a homogenizer was charged with 32.4 g of N,N-dimethylformamide (DMF) having a water content of less than 100 ppm. To the DMF was added 10.8 g of a polymer, CEFRAL SOFT G180F100 (manufactured by Central Glass K.K., a polymer having a backbone of vinylidene fluoride-chlorotrifluoroethylene (VDF-CTFE) copolymer and side chains of polyvinylidene fluoride wherein the proportions of the backbone and the side chain in the polymer are 65% and 35% by weight of the entire weight, respectively, and the proportions of VDF and CTFE in the backbone are 80 mol % and 20 mol %, respectively, the polymer having a melting point of 1670° C.). While heating at 80° C., the polymer was dispersed and dissolved at 10,000 rpm for 30 minutes. To this solution further added was 27.6 of DMF. The polymer was dispersed and dissolved at 80° C. and 10,000 rpm for a further 30 minutes. After the solution was allowed to cool, 19.2 g of an electrolytic solution, 1M LiPF$_6$/EC+PC was added to the solution. It is noted that 1M LiPF$_6$/EC+PC is a solution of 1M LiPF$_6$ electrolyte salt in a solvent mixture of ethylene carbonate (EC) and propylene carbonate (PC) in a volume ratio of 1:1. The combined solution was agitated at 5,000 rpm for 15 minutes, obtaining a gel electrolyte solution. The gel electrolyte solution was applied to a polyethylene terephthalate (PET) film over a width of 50 mm by means of an applicator having a gap of 0.8 mm. The coating was allowed to stand for 24 hours to evaporate off the DMF, obtaining a translucent gel electrolyte consisting of CEFRAL SOFT G180F100/LiPF$_6$/EC+PC.

The film had elasticity and sufficient strength to handle. The film had a gage of 0.18 mm. The composition of the charge was CEFRAL SOFT G180F100:1M LiPF$_6$/EC+PC= 36:64% by weight. FIG. 1 shows the temperature response of the conductivity of this gel electrolyte. The conductivity was measured by the AC impedance method using a LCR meter 4284A by Hewlett Packard. For measurement, the gel electrolyte was cut into a disc with a diameter of 15 mm, which was sandwiched between electrodes of SUS304 having a diameter of 20 mm whereupon a resistance was measured at 10 kHz. As a result, the gel electrolyte exhibited a conductivity as high as $1.6 \times 10^{-3}$ S/cm at 25° C. and maintained such high conductivity over a wide temperature range as shown in FIG. 1.

EXAMPLE 2

A container of a homogenizer was charged with 45 g of the gel electrolyte solution (CEFRAL SOFT G180F100+ DMF+1M LiPF$_6$/EC+PC) prepared in Example 1, to which 10.8 g of lithium cobaltate and 1.35 g of acetylene black (trade name HS-100 by Denki Kagaku Kogyo K. K.) were added. Dispersion was done at room temperature and 12,000 rpm for 5 minutes. This coating solution was printed as a circular spot with a diameter of 15 mm to an aluminum foil (30 mm long, 30 mm wide, 30 µm thick) by means of a metal mask printing machine and allowed to stand for 24 hours to evaporate off the DMF. This electrode had a film gage of 0.15 mm. On this electrode serving as a positive electrode, a disc with a diameter of 25 mm cut from the polymeric solid electrolyte film prepared in Example 1, a lithium foil with a diameter of 20 mm and a gage of 0.1 mm, and a nickel foil (30 mm long, 30 mm wide, 35 µm thick) were stacked in the described order. The periphery of the assembly was sealed with a polyolefin base hot-melt adhesive, fabricating a lithium secondary cell. This cell had an internal resistance as low as 50 Ω.

EXAMPLE 3

A container of a homogenizer was charged with 40 g of the gel electrolyte solution (CEFRAL SOFT G180F100+ DMF+1M LiPF$_6$/EC+PC) prepared in Example 1, to which 8.89 g of graphite (trade name SFG25 by Lonza, 90% cumulative particle size 25 µm) was added. Dispersion was done at room temperature and 12,000 rpm for 5 minutes. This coating solution was printed as a circular spot with a diameter of 15 mm to a copper foil (30 mm long, 30 mm wide, 30 µm thick) by means of a metal mask printing machine and allowed to stand for 24 hours to evaporate off the DMF. This electrode had a film gage of 0.15 mm. On this electrode serving as a negative electrode, a disc with a diameter of 25 mm cut from the polymeric solid electrolyte film prepared in Example 1 and the positive electrode prepared in Example 2 were stacked. The periphery of the assembly was sealed with a polyolefin base hot-melt adhesive, fabricating a Li-ion secondary cell. This cell had an internal resistance as low as 20 Ω.

EXAMPLE 4

A gel electrolyte consisting of G180F100:PVDF:1M LiPF$_6$/EC+PC=18:18:64% by weight was prepared by the same procedure as in Example 1. It is noted that the PVDF used herein was a homopolymer (KYNAR 741 by Elf Atochem). The gel electrolyte exhibited a conductivity as high as $3.0 \times 10^{-3}$ S/cm at 25° C.

EXAMPLE 5

A gel electrolyte consisting of G180F100:1M LiPF$_6$/EC+PC=30:70% by weight was prepared by the same procedure as in Example 1. It exhibited a conductivity as high as $4.0 \times 10^{-3}$ S/cm at 25° C.

EXAMPLE 6

Figure 2:
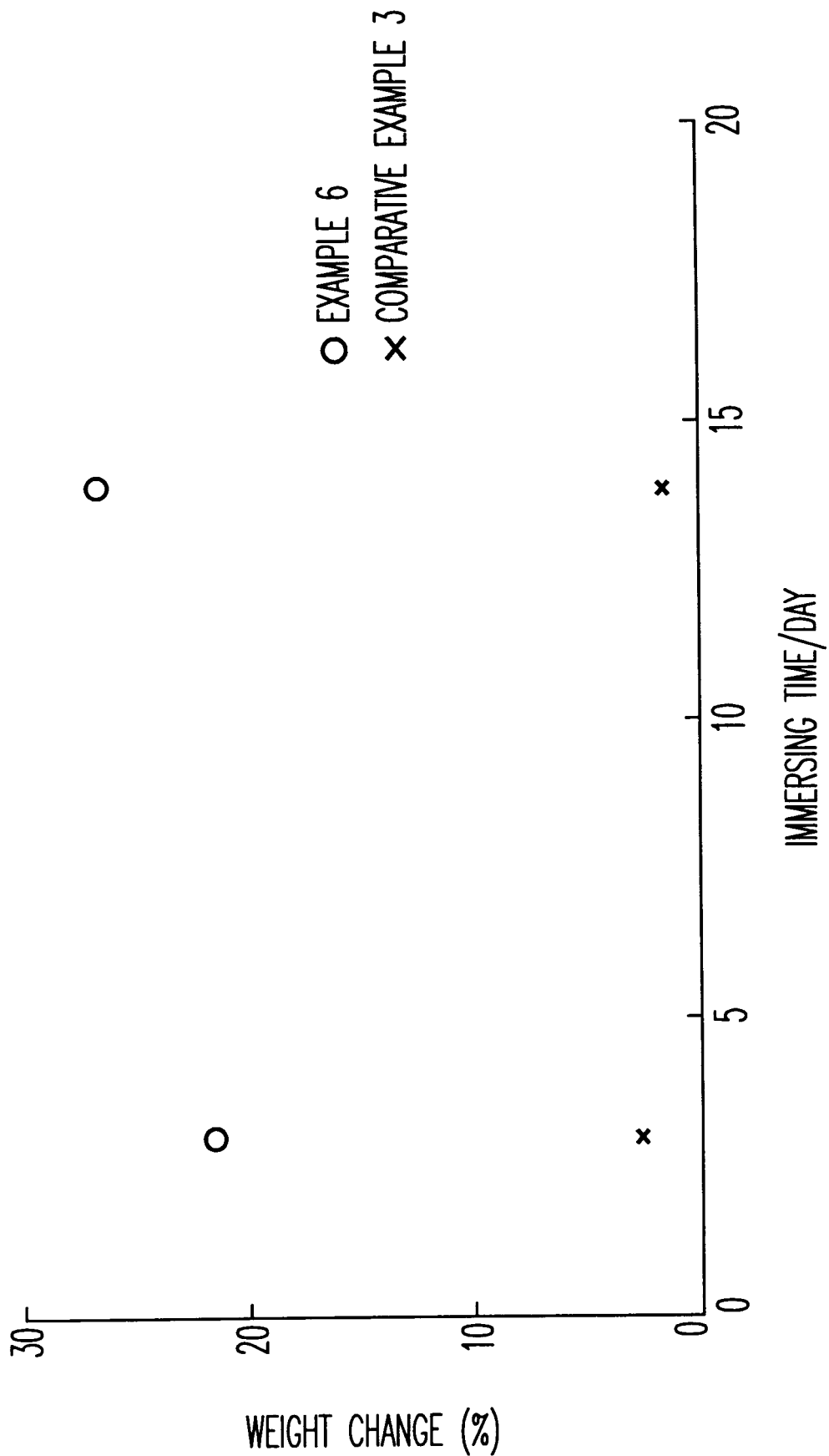
FIG. 2 is a graph showing a weight change occurring when a gel electrolyte according to the invention was immersed in an electrolytic solution.

The gel electrolyte film prepared in Example 1 was immersed in 100 ml of an electrolytic solution 1M LiPF$_6$/EC+PC and kept at 80° C. to examine a weight change. The results are shown in FIG. 2. It is seen from FIG. 2 that the gel electrolyte film of this Example can retain a more amount of the electrolytic solution than the gel electrolyte film of Comparative Example 3 to be described later.

EXAMPLE 7

A gel electrolyte consisting of G180F100:1M (C$_2$H$_5$)$_4$NBF$_4$/PC=30:70% by weight was prepared by the same procedure as in Example 1. It exhibited a conductivity as high as $1.5 \times 10^{-3}$ S/cm at 25° C. It is noted that (C$_2$H$_5$)NBF$_4$ is ammonium tetraethyl tetrafluoroborate.

EXAMPLE 8

A fabric of activated carbon fibers (product No. ACC507-20 by Gunei Chemical Industry K.K.) having aluminum thermally sprayed on one surface thereof was cut into discs with a diameter of 15 mm, which were immersed in 50 ml of the gel electrolyte solution prepared in Example 7 for 5 minutes, taken out of the solution, and dried for 24 hours. They were ready for use as a polarizing electrode. Using a pair of the polarizing electrodes and a disc with a diameter of 20 mm cut from the gel electrolyte film prepared in Example 7, a coin type cell was fabricated. The cell was charged at 1 mA to 2 V and then discharged to 1 V. The discharge capacitance was 1.5 F.

EXAMPLE 9

A gel electrolyte was prepared as in Example 1 except that CEFRAL SOFT G150F100 (manufactured by Central Glass K.K.) was used. G150F100 has a higher melt viscosity than G180F100 used in Example 1. More specifically, it is a polymer having a backbone of VDF-CTFE copolymer and side chains of PVDF wherein the proportions of the backbone and the side chain are 70% and 30% by weight, respectively, and the proportions of VDF and CTFE in the backbone are 80 mol % and 20 mol %, respectively, the polymer having a melting point of 165° C. The composition of the gel electrolyte was G150F100:1M LiPF$_6$/EC+PC= 34:64% by weight. This gel electrolyte was tested as in Example 1, finding a conductivity as high as $3.0 \times 10^{-3}$ S/cm at 25° C. The conductivity relative to temperature of this gel electrolyte is shown in FIG. 1. It is evident from FIG. 1 that high conductivity is available over a wide temperature range.

An electric double-layer capacitor as in Example 8 and a lithium secondary battery as in Example 13 were fabricated using this CEFRAL SOFT G150F100, obtaining equivalent results.

COMPARATIVE EXAMPLE 1

A 200-ml triangular flask was charged with 66.67 g of tetrahydrofuran (THF) having a water content of less than 30 ppm and 21.33 g of 1M $LiPF_6$/EC+PC, which were agitated for 5 minutes. To the solvent mixture was added 12.00 g of a VDF-HFP copolymer (trade name KYNAR 2801 by Elf Atochem, HFP content 10% by weight). The contents were agitated at room temperature for 15 minutes and for a further 15 minutes while boiling, obtaining a clear gel electrolyte solution. As in Example 1, the gel electrolyte solution was applied to a PET film and dried at room temperature for 1 hour to evaporate off the THF. The composition of the charge was KYNAR 2801:1M $LiPF_6$/EC+PC=36:64% by weight. In the thus obtained gel electrolyte, translucent portions coexisted with white portions wherein probably the electrolyte salt had crystallized. This polymeric solid electrolyte exhibited a conductivity of $1.2 \times 10^{-3}$ S/cm at 25° C.

COMPARATIVE EXAMPLE 2

A container of a homogenizer was charged with 50 g of the gel electrolyte solution (KYNAR 2801+THF+1M $LiPF_6$/EC+PC) prepared in Comparative Example 1, 12.00 g of lithium cobaltate (the same as in Example 2) and 1.5 g of acetylene black (the same as in Example 2), which were dispersed at 12,000 rpm for 5 minutes. As in Example 2, the coating solution thus obtained was printed to an aluminum foil by means of a metal mask printing machine and allowed to stand at room temperature for 1 hour to evaporate off the THF. A lithium secondary cell was then fabricated as in Example 2. The cell had an internal resistance as high as 1,000 Ω and could not be charged or discharged. When a load was applied to the cell, the internal resistance lowered, but still remained as high as about 100 Ω.

COMPARATIVE EXAMPLE 3

The gel electrolyte film prepared in Comparative Example 1 was immersed in 100 ml of an electrolytic solution 1M $LiPF_6$/EC+PC and kept at 80° C. to examine a weight change. The results are shown in FIG. 2. It is seen from FIG. 2 that the gel electrolyte film of this Comparative Example could not retain the electrolytic solution as much as the gel electrolyte film of Example 6.

EXAMPLE 10

A container of a homogenizer was charged with 60.00 g of DMF and 20.00 g of CEFRAL SOFT G180F100. While heating at 60° C., the contents were dispersed and dissolved at 3,500 to 7,000 ppm for 40 minutes. To the solution was added 19.01 g of DMF. The contents were dispersed and dissolved at 60° C. and 2,500 to 7,000 ppm for a further 30 minutes. Next, a kneader mill (Labo Plasto Mill by Toyo Seiki K.K.) was charged with 59.12 g of high purity natural graphite NG7 (by Kansai Thermochemical K.K.), to which 18.66 g of the previously formed CEFRAL SOFT solution and 7 g of DMF were added and kneaded at 100 rpm for 1 hour. The resulting clay-like kneaded product, 30.00 g, and 16.72 g of DMF were introduced in a beaker and kneaded at 700 rpm for 1½ hours by means of a mixer. The coating solution thus obtained was applied to a titanium plate of 12 mm×12 mm (gage 1 mm) over an area of 10 mm×10 mm through a metal mask. Separately, the coating solution was applied to a copper foil of 15 μm thick, 45 mm wide and 150 mm long by means of an applicator having a gap of 0.8 mm. The coatings were dried in vacuum at 150° C. for 2 hours to remove the solvent. This electrode had a composition of Cefral Soft:graphite=6:94% by weight. A titanium wire was spot welded to the titanium plate which was used as an electrode. The coatings had a thickness of 0.2 to 0.3 mm.

Figure 3:
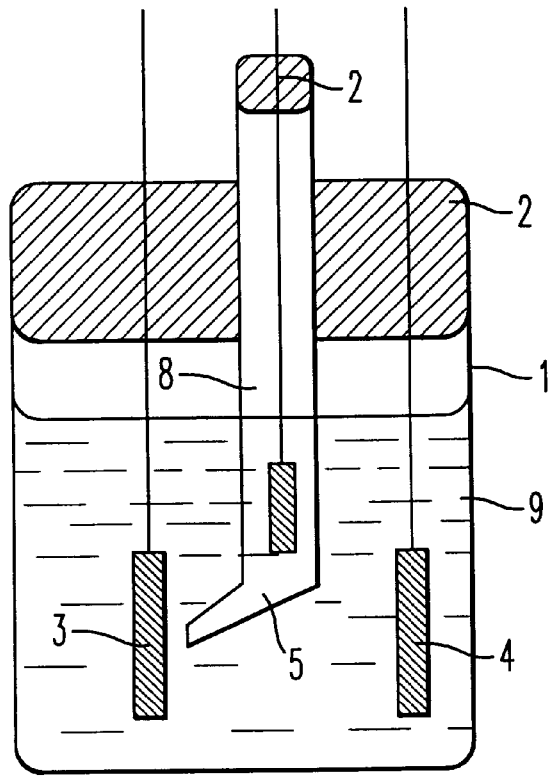
FIG. 3 is a cross-sectional view of a cell for the measurement of charge/discharge performance.

A charge/discharge test was carried out using this electrode as a working electrode. The counter electrode and the reference electrode used were lithium plates having a titanium wire connected thereto. The electrolytic solution used was a solution of 1 mol lithium perchlorate in a solvent mixture of ethylene carbonate and diethyl carbonate in a volume ratio of 1:1. Charge/discharge was carried out at a constant current of 0.25 mA in the range from 0 to 3 volts vs. Li/Li+. FIG. 3 illustrates in cross section a cell for the measurement of charge/discharge properties. 1 designates a glass beaker of 100 cm³, 2 a silicone plug, 3 a working electrode, 4 a counter electrode, 5 a reference electrode, 8 a Luggin probe, and 9 an electrolytic solution.

The coating on the copper foil was subject to an adhesion test known as a crosscut test. More particularly, using a multi-cross cutter Model 295 by Erichsen GmbH of Germany, the coating was incised with eleven cut lines in each of longitudinal and transverse directions to define 100 sections. The number of peeled coating sections was counted. The results are shown in Table 1.

TABLE 1

|  | E10 | E11 | E12 | CE4 | CE5 | CE6 |
|---|---|---|---|---|---|---|
| Discharge capacitance in 2nd cycle, mAh/g | 363 | 364 | 150 | 320 | 320 | 100 |
| Capacitance loss, % | 0.5 | 0.4 | 0.5 | 10 | 9 | 8 |
| Adhesion test, peeled sections | 0/100 | 0/100 | 0/100 | 50/100 | 100/100 | — |

The results of the charge/discharge test show satisfactory cell properties as demonstrated by a discharge capacitance in the second cycle as high as 363 mAh per gram of graphite and a capacitance loss as small as 0.5% represented by the following equation.

Capacitance loss ={(discharge capacitance in 2nd cycle)−(discharge capacitance in 30th cycle)}/(discharge capacitance in 2nd cycle)×100%

Satisfactory results were obtained in the adhesion test too since the number of peeled sections was zero.

COMPARATIVE EXAMPLE 4

An electrode was prepared as in Example 10 except that polyvinylidene fluoride (PVDF) (KYNAR 741 by Elf Atochem) was used as the binder.

As a result, the discharge capacitance in the second cycle was 320 mAh/g and the capacitance loss was as large as 10%. In the adhesion test too, 50 sections were peeled per 100 sections, indicating low bond strength.

EXAMPLE 11

An electrode was prepared as in Example 10 except that the electrode composition consisted of Cefral Soft G180F100:graphite=10:90% by weight.

The results of the charge/discharge test show satisfactory cell properties as demonstrated by a discharge capacitance in the second cycle as high as 364 mAh/g and a capacitance loss as small as 0.4%. No coating sections were peeled in the adhesion test, indicating satisfactory adhesion.

COMPARATIVE EXAMPLE 5

An electrode was prepared as in Example 11 except that polyvinylidene fluoride (PVDF) (KYNAR 741 by Elf Atochem) was used as the binder.

As a result, the discharge capacitance in the second cycle was 320 mAh/g and the capacitance loss was as large as 9%. In the adhesion test, all 100 sections were peeled off.

EXAMPLE 12

A positive electrode was prepared using Cefral Soft G180F100 as a binder and lithium cobaltate as a positive electrode active material. Acetylene black (Denka Black HS100 by Denki Kagaku Kogyo K.K.) was used as a conductive aid. The composition consisted of lithium cobaltate:Cefral Soft:acetylene black=82:9:9% by weight. Except for these differences, an electrode was prepared and tested as in Example 1. Using this electrode as the working electrode and lithium as the counter electrode and reference electrode, charge/discharge was carried out at 0.5 mA over the potential range between 3.0 volts and 4.2 volts.

The results show satisfactory cell properties as demonstrated by a discharge capacitance in the second cycle as high as 150 mAh/g and a capacitance loss as small as 0.5%.

Satisfactory results were obtained in a similar adhesion test too since the number of peeled sections was zero.

Equivalent results to those of Examples 10 to 12 were obtained with Cefral Soft G150F100.

COMPARATIVE EXAMPLE 6

A positive electrode was prepared as in Example 12 except that PVDF (KYNAR 741) was used as the binder.

As a result, the discharge capacitance in the second cycle was 100 mAh/g and the capacitance loss was as large as 8%.

EXAMPLE 13

Figure 4:
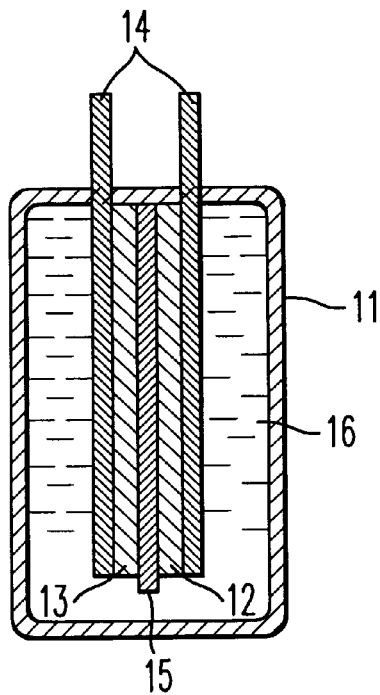
FIG. 4 is a cross-sectional view of a lithium secondary cell according to one embodiment of the invention.

A lithium secondary battery as shown in FIG. 4 was fabricated by using the electrode of Example 12 as a positive electrode 13 and the electrode of Example 10 as a negative electrode 12, connecting titanium leads 14 to the positive and negative electrodes 13 and 12 as external terminals, and sealingly containing these members, a polyethylene separator 15, and an electrolytic solution 16 of 1M $LiClO_4$ in a solvent mixture of ethylene carbonate and diethyl carbonate in a volume ratio of 1:1 in a battery casing 11. The battery exhibited satisfactory battery properties.

Equivalent results were obtained again with Cefral Soft G150F100.

What is claimed is:

1. A polymeric solid electrolyte comprising a polymer having a vinylidene fluoride copolymer as a backbone and polyvinylidene fluoride in a side chain, an electrolyte salt, and a solvent.

2. The polymeric solid electrolyte of claim 1 wherein said vinylidene fluoride copolymer is a copolymer of vinylidene fluoride with chlorotrifluoroethylene.

3. A polymeric solid electrolyte comprising a mixture of the polymer of claim 1 with polyvinylidene fluoride, an electrolyte salt, and a solvent.

4. A lithium secondary cell comprising a polymeric solid electrolyte containing a polymer having a vinylidene fluoride copolymer as a backbone and polyvinylidene fluoride in a side chain, an electrolyte salt, and a solvent.

5. The lithium secondary cell of claim 4 wherein said vinylidene fluoride copolymer is a copolymer of vinylidene fluoride with chlorotrifluoroethylene.

6. The lithium secondary cell of claim 4 wherein the polymeric solid electrolyte contains said polymer in the form of a mixture with polyvinylidene fluoride.

* * * * *